Aug. 6, 1940.  G. W. RISIEN ET AL  2,210,126
COFFEE MAKING APPARATUS
Filed March 7, 1938  2 Sheets-Sheet 1
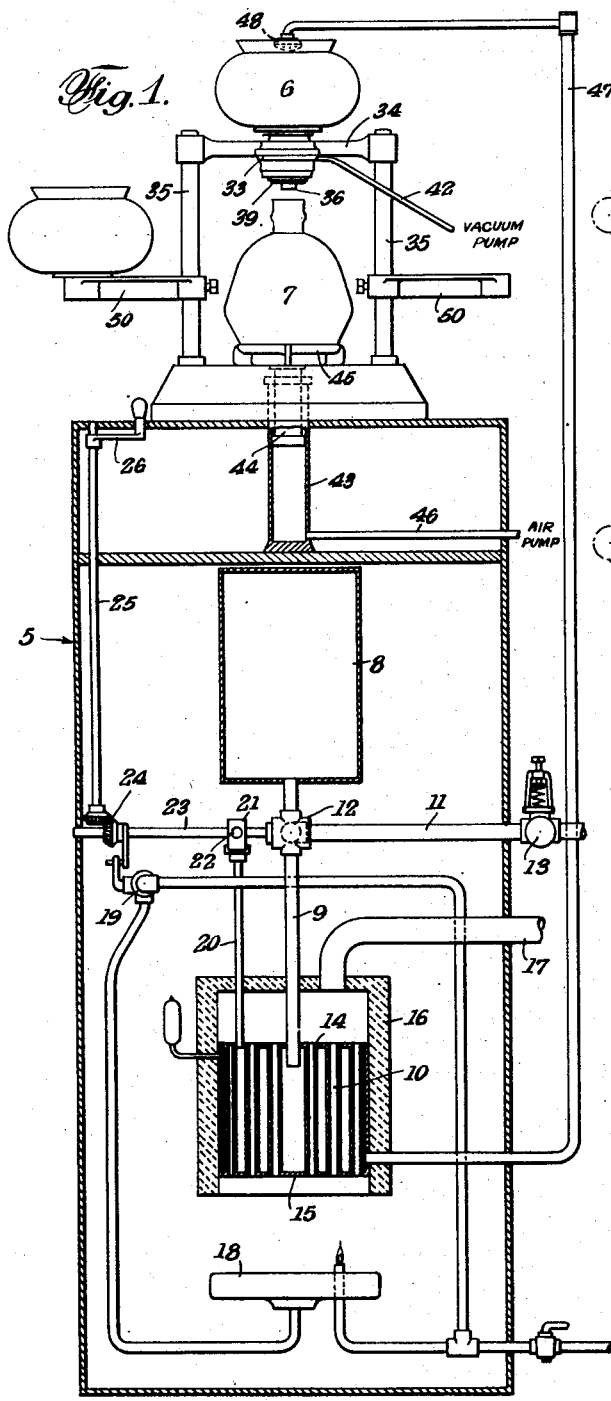
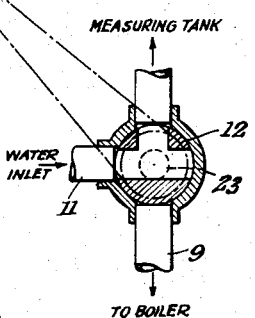
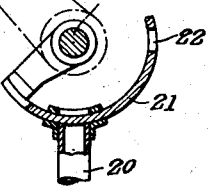
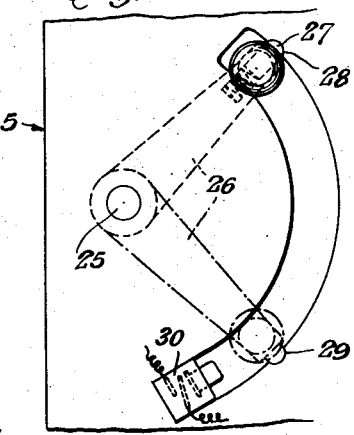
INVENTORS
*GEORGE RISIEN*
*CONRAD FORSCHNER*
BY
*Mitchell Bichert*
ATTORNEYS

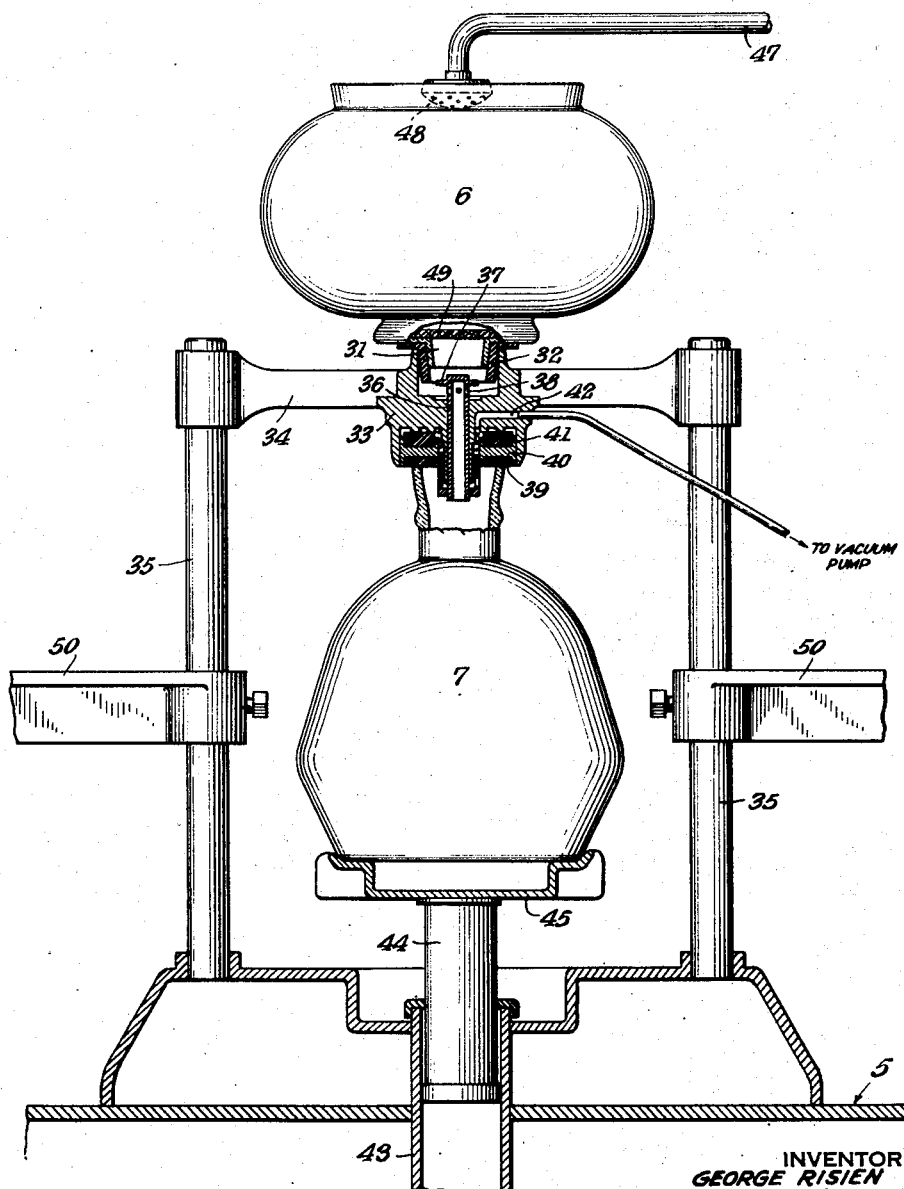

Patented Aug. 6, 1940

2,210,126

UNITED STATES PATENT OFFICE 2,210,126

COFFEE MAKING APPARATUS

George W. Risien, New York, and Conrad Forschner, Astoria, N. Y.

Application March 7, 1938, Serial No. 194,242

6 Claims. (Cl. 53—3)

Our invention relates to an apparatus for making coffee, particularly adapted for restaurant and hotel use.

In apparatus for making coffee in reasonable quantities as required in a restaurant, it is highly desirable that the apparatus be simple; that the operation of the device be rather rapid, and that the number and complexity of manipulations be reduced to a minimum.

With the above requirements in mind, it is an object of our invention to provide a coffee making apparatus which is simple in construction and operation and not likely to get out of order.

Another object is to provide a coffee making apparatus where only a single part need be manipulated for the automatic or semi-automatic making of coffee.

A further object is to provide in a coffee making apparatus improved means for varying the predetermined amount of water to be added in accordance with requirements.

Another object is to provide improved means for automatically or semi-automatically moving the ground coffee receptacle and the brewed coffee receptacle into fluid-tight engagement with each other and creating a partial vacuum in the brewed coffee receptacle.

Other objects and various features of invention will be hereinafter pointed out or will become apparent to those skilled in the art.

In the drawings which show, for illustrative purposes only, a preferred form of the invention—

Fig. 1 is a more or less illustrative sectional view of a coffee making apparatus in accordance with our invention;

Fig. 2 is a fragmentary enlarged view in partial section of the upper end of our apparatus;

Fig. 3 is a transverse sectional view taken through the water valve of Fig. 1;

Fig. 4 is a transverse sectional view taken through the boiler vent device of Fig. 1;

Fig. 5 is a top plan view of a fragment of the lower casing and illustrating the single control member of the apparatus.

In said drawings, 5 indicates generally a base or casing for parts of the coffee making apparatus. From this base are supported the ground coffee receptacle 6 and the brewed coffee receptacle 7, all as will be more fully hereinafter described. Within the base 5 is a measuring tank 8 for containing a measured quantity of water to be discharged through pipe 9 into the boiler 10. A water inlet pipe 11 is connected by means of the three-way valve 12 (Fig. 3) so as to conduct water into the measuring tank 8 when the valve is in one position and to close communication between the pipe 11 and the measuring tank 8 and open communication between the measuring tank and the boiler when the three-way valve is in another rotative position. In order to provide a very simple means for measuring a predetermined quantity of water in the tank 8, I employ a closed tank which when emptied will be filled with air at atmospheric pressure. In the water service line 11, I interpose a reducing valve 13 of any desired type and which is adjustable for varying the outlet pressure and maintaining that pressure accurately within prescribed limits. Thus, with the water in the pipe 11 at any given reduced pressure the air in the tank 8 will be compressed a definite amount and if the tank 8 be filled with atmospheric pressure air each time before the tank is filed, the same quantity of water will be measured into the tank and subsequently discharged into the boiler 10. The valve 13 is adjustable for varying the measured quantity of water.

The boiler 10 is preferably of tubular type, including top and bottom sheets 14—15 having fire tubes running through and connecting them, all as will be understood. The insulating jacket 16 may surround the boiler and a smoke pipe or breeching 17 may be connected to the hood 16 for conducting away products of combustion or gases from the burner. Beneath the boiler 10 is a heating means such as a gas burner 18, and gas is admitted through the gas pipe and a suitable valve or cock 19, as will be understood. When the cock 19 is in one position gas to the burner 18 will be shut off and when the cock is in another position gas will be turned on.

The boiler is provided with a vent pipe 20, which is automatically controlled as to its opening by a single manipulative means employed during the coffee making operation. As illustrated, the pipe 20 may normally be covered by an arcuate sliding plate 21 which has an opening 22 therein to communicate with the pipe 20 and open the boiler to the atmosphere when the plate 21 is angularly swung to the proper position. In the form shown, the plug of the three-way valve 12 and the plate 21 of the vent device for pipe 20, as well as the gas cock 19, are all operated directly by or from a single oscillating shaft 23, which is manually operated. In the form illustrated, the shaft 23 is connected by means of bevel gears 24 to a vertical shaft 25 and a lever or handle 26 (see also Fig. 5) is connected to the shaft 25 and serves to rotate it for rotating the shaft 23. The lever or handle 26 is accessible at the top of the case 25 in a convenient location and its movement is limited angularly to about 90°, in the present showing. Since the shafts 25 and 23 are connected by bevel gears having a 1—1 ratio, any movement of the shaft 25 will impart the same angular movement to the shaft 23 and for that reason in Figs. 3 and 4 we have shown in dot-dash lines a handle which might correspond to the handle 26, since it will be convenient to refer to the position of the handle 26 in connection with Figs. 3 and 4. In connection with the handle 26, I prefer to employ a spring-pressed detent 27 which may take into either of two depressions 28—29 when the handle 26 is moved to either the left or right-hand position, for a purpose to be later described. The handle 26 may be moved a very short distance to the right or beyond the lowermost position of Fig. 5 to close any suitable type of electric switch 30, which controls the motor for operating the vacuum and air pumps or equivalent means, for a purpose which will appear.

The ground coffee receptacle 6 preferably comprises a large-mouthed jar having a downwardly directed bottom spout 31, which may fit upon a cushion or gasket 32 on the valve base 33, as will be clear from Fig. 2. The valve base 33 is preferably a part of or carried by a cross-beam 34 adjustable on standards 35—35 of any suitable number, such as 3. The valve base has a central opening therethrough for the passage of a hollow tube valve 36 having a disk 37 at the top to seat on the valve base 33. The tube 36 has a plurality of passages 38 near the upper end, beneath the valve disk 37, so that when the valve tube 36 is raised fluid may flow from the ground coffee receptacle 6 downwardly through the tube 36 and into the brewed coffee receptacle 7, as will be described.

The brewed coffee receptacle is raised by means of air pressure, as will be later described, and the upper surface of the neck of the bottle 7 engages a rubber or other gasket 39 carried in a guiding disk 40 which itself is secured to or positioned to actuate and raise the valve tube 36 when the gasket 39 and guide disk 40 are raised by the coffee receptacle 7. Above the disk 40 is a second seal disk 41 which seats on an annular surface in the guiding counterbore for the disk 40 so that there is a fluid-tight connection between the ground coffee receptacle 6 and the brewed coffee receptacle or bottle 7 when the latter is raised into the position shown in Fig. 2. When the valve tube 36 is raised as shown in Fig. 2 fluid from the receptacle 6 may flow downwardly through the passages 38 and tube 36 into the receptacle 7. A vacuum connection 42 from the vacuum pump or other vacuum inducing means is made to the valve base 33 at a point inwardly of the seal so that when the receptacles 6—7 are sealed to each other a vacuum induced in the passage 42 will exhaust the air from the receptacle 7 and consequently draw fluid from the receptacle 6.

As heretofore stated, the brewed coffee receptacle 7 is raised into the position shown in Fig. 2 and lowered to the position shown in Fig. 1 to permit removal of the receptacle 7. It is preferred that the receptacle 7 be elevated by compressed air furnished by an air pump, which may be operated by the same motor which operates the vacuum pump. The two pumps are preferably operated simultaneously. Supported in the base 5 is a cylinder 43 which receives a piston or plunger 44 having a supporting platen 45 at the top shaped to properly fit or receive the bottom of the brewed coffee receptacle 7. An air connection 46 from the air pump referred to is made to the bottom of the cylinder 43 so that when the air and vacuum pumps are both operating, the brewed coffee receptacle 7 will be raised so as to seal the two receptacles to each other except through the now open valve tube 36, and the vacuum being induced in the receptacle 7 will draw brewed coffee from the ground coffee receptacle and permit it to fall into the brewed coffee receptacle 7.

The operation of our device as a whole is as follows:

Ground coffee in the proper amount is put in the ground coffee receptacle 6. The measuring tank 8 is filled with water by actuating the lever handle 26 in a direction to open the water supply to the measuring tank as shown in Fig. 3. Water flows into the measuring tank 8 under the pressure determined by the setting of the reducing valve 13 and the quantity of water is thus measured. The handle 26 is then moved so as to rotate the shaft 11 to cut off the water supply to the tank and to open the tank to the boiler, as will be understood. This movement of the handle to the right also opens the vent 20 and permits the water to pass freely into the boiler from the measuring tank. The normal position of the apparatus may be said to be that in which the handle 26 is in the right-hand (lower) position shown in Fig. 5, in which position the boiler will have received its measured quantity of water and the measuring tank will be cut off from the water supply. The handle 26 is then moved to the left-hand (upper) position of Fig. 5, which movement rotates the shaft 11 so as to again open the measuring tank to the water supply and cut off the vent 20. This same movement actuates the gas valve 19 and gas at the burner 18 is ignited by the pilot illustrated. In a very short time the water in the boiler is raised to the boiling point and the steam generated forces the water from the closed boiler up through the pipe 47 and spray nozzle device 48, which sprays the water almost at the boiling point over the ground coffee in the receptacle 6 and the spray action also serves to agitate the coffee and assures a proper mixture of the ground coffee and water. It will be understood that at this time the valve disk 37 will be down on its seat and the water and ground coffee will stand in the receptacle 6. The brewed coffee receptacle 7 is then placed or will previously have been placed on the platen 45. When the coffee has brewed in the receptacle 6 a sufficient length of time, the handle 26 is moved over to its extreme right-hand position so as to close the switch 30 and start the vacuum and pressure pumps. Pressure fluid from the air pump passes through pipe 46 and raises the plunger 44 so as to elevate the brewed coffee receptacle 7 and move the seal disk 40 with its seals 39—41 so as to seal the receptacles 6—7 to each other. When the seal disk 40 is raised, the valve disk 37 is unseated so as to uncover the port 48. The vacuum pump serves to exhaust air from the receptable 7 and the brewed coffee is drawn through the filter 49 and into the brewed coffee receptacle 7. As soon as all of the brewed coffee has passed into the receptacle 7, the handle 26 is moved back the short distance to the right-hand position shown in Fig. 5 so as to cut off the air and vacuum pumps and the platen 45 will then descend so that the brewed coffee receptacle 7 may be removed. It will be understood from what has been said heretofore that the movement of the handle 26 to its right-hand (lower) position as shown in Fig. 5 or its extreme right-hand position so as to close the switch 30 will serve to shut off the gas and open the measuring tank to the boiler so as to again fill the boiler with a predetermined quantity of water for the next coffee brewing.

It is preferred to have one or more cup brackets 50 adjustably supported on the standards 35 and arranged to hold ground coffee receptacles corresponding to the receptacle 6 so that spare receptacles with the requisite amount of coffee therein may be held on the apparatus for instant use when required. It is to be observed that, with an efficient type of burner and boiler as shown, the water in the boiler will be raised to the boiling point in a very short time, and ordinarily the hot water is left in contact with the ground coffee for a relatively short period in order to get the desirable ingredients from the coffee and without entirely leaching the coffee grounds. Thus, coffee in substantial quantities, say, sixteen cups at a time or any other desired quantity, may be made in a relatively short time and with a minimum of effort and manipulation. The only member requiring manipulation for filling the boiler, raising the brewed coffee receptacle, and in fact doing everything necessary for the making of coffee, is the handle 26 and it is capable of only back and forth movement. The parts are all of sturdy and simple construction and are not likely to get out of order. The apparatus is accurate and rapid in its action. The quantity of coffee made may be readily varied merely by resetting the reducing valve 13. Coffee of very high and uniform quality may be produced.

While the invention has been described in considerable detail and a preferred form illustrated, it is to be observed that various changes and modifications may be made within the scope of the invention as defined in the appended claims.

We claim:

1. In a device of the character indicated, a measuring tank, a boiler, valve means for putting said measuring tank and boiler into communication whereby a measured quantity of water may be emptied into said boiler, heating means for said boiler, a ground coffee receptacle, a pipe communicating from a lower level of said boiler and leading to said ground coffee receptacle whereby steaming of water in said boiler will force hot water from said boiler through said pipe and into said ground coffee receptacle, a brewed coffee receptacle, fluid pressure means for moving said brewed coffee receptacle and ground coffee receptacle into fluid-tight communication with each other, vacuum inducing means for creating a partial vacuum in said brewed coffee receptacle and to cause coffee from said ground coffee receptacle to pass into said brewed coffee receptacle, and a common means for controlling the function of all the aforesaid elements in the proper order.

2. In a device of the character indicated, a boiler, a ground coffee receptacle, a brewed coffee receptacle, fluid pressure means for moving said receptacles into fluid-tight engagement with each other, heating means for said boiler, a conduit from a lower level of said boiler to said ground coffee receptacle whereby steam formed above the water level in said boiler may force hot water therefrom into said ground coffee receptacle, and a single common control member for controlling the heating of said boiler and the moving of said receptacles as aforesaid.

3. In a device of the character indicated, a boiler, a ground coffee receptacle, a brewed coffee receptacle supported therebeneath, a pipe communicating with a lower level of said boiler and said ground coffee receptacle for the purpose described, fluid pressure actuated means for moving said brewed coffee receptacle into fluid-tight communication with said ground coffee receptacle, vacuum inducing means for inducing a vacuum in said brewed coffee receptacle, and a single control member for simultaneously actuating said vacuum inducing means and said fluid pressure means for raising said brewed coffee receptacle.

4. In a device of the character indicated, a boiler, a ground coffee receptacle, a brewed coffee receptacle supported therebeneath, a pipe communicating with said boiler and ground coffee receptacle for conducting hot water from said boiler to said ground coffee receptacle, fluid pressure actuated means for raising said brewed coffee receptacle into fluid-tight communication with said ground coffee receptacle, an air pump for providing air pressure for raising said brewed coffee receptacle as aforesaid, a vacuum pump and communicating conduit for inducing a partial vacuum in said brewed coffee receptacle, and means for causing concurrent action of said air and vacuum pumps, for the purpose described.

5. In a device of the character indicated, a measuring tank, a boiler, valve means for putting said measuring tank and boiler into communication whereby a measured quantity of water may be emptied into said boiler, heating means for said boiler, a ground coffee receptacle, a pipe communicating from a lower level of said boiler and leading to said ground coffee receptacle whereby steaming of water in said boiler will force hot water from said boiler through said pipe and into said ground coffee receptacle, a brewed coffee receptacle, means for moving said brewed coffee receptacle and ground coffee receptacle into fluid-tight communication with each other, vacuum inducing means for creating a partial vacuum in said brewed coffee receptacle to cause coffee from said ground receptacle to pass into said brewed coffee receptacle, and a common means for controlling the operation of said valve means, heating means and vacuum inducing means.

6. In a device of the character indicated, a measuring tank, a boiler, valve means for putting said measuring tank and boiler into communication whereby a measuring quantity of water may be emptied into said boiler, heating means for said boiler, a ground coffee receptacle, a pipe communicating from a lower level of said boiler and leading to said ground coffee receptacle whereby steaming of water in said boiler will force hot water from said boiler through said pipe and into said ground coffee receptacle, a brewed coffee receptacle, means for removably holding said brewed coffee and ground coffee receptacles in fluid-tight engagement with each other, vacuum inducing means for creating a partial vacuum in said brewed coffee receptacle to cause coffee from said ground coffee receptacle to pass into said brewed coffee receptacle, and a common means for controlling the operation of said valve means, heating means and vacuum inducing means.

GEORGE W. RISIEN.
CONRAD FORSCHNER.